(12) United States Patent
Goto et al.

(10) Patent No.: US 7,680,110 B2
(45) Date of Patent: Mar. 16, 2010

(54) COMMUNICATION DEVICE, COMMUNICATION SYSTEM, AND COMMUNICATION METHOD

(75) Inventors: Masataka Goto, Kanagawa (JP); Masahiro Takagi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1003 days.

(21) Appl. No.: 11/236,808

(22) Filed: Sep. 28, 2005

(65) Prior Publication Data
US 2006/0072584 A1 Apr. 6, 2006

(30) Foreign Application Priority Data
Sep. 28, 2004 (JP) ............... 2004-282775

(51) Int. Cl.
*H04L 12/28* (2006.01)
*H04L 12/56* (2006.01)
*G06F 7/04* (2006.01)
*G06F 15/16* (2006.01)
*G06F 17/30* (2006.01)
*H04L 29/06* (2006.01)
*H04H 20/71* (2006.01)

(52) U.S. Cl. ............... 370/390; 726/4; 726/5; 726/6; 726/13

(58) Field of Classification Search ............ 726/14, 726/15; 713/189, 190
See application file for complete search history.

(56) References Cited

U.S. PATENT DOCUMENTS 7,188,364 B2 * 3/2007 Volpano ............ 726/15

2003/0037169 A1 * 2/2003 Kitchin ............ 709/249
2004/0141617 A1 * 7/2004 Volpano ............ 380/270
2005/0135625 A1   6/2005 Tanizawa et al. ...... 380/270
2005/0223111 A1 * 10/2005 Bhandaru et al. ..... 709/236
2007/0286108 A1 * 12/2007 Meier et al. .......... 370/312

FOREIGN PATENT DOCUMENTS

| JP | 9-284329 | 10/1997 |
|----|----------|---------|
| JP | 11-177582 | 7/1999 |
| JP | 2004-200812 | 7/2004 |
| JP | 2004-242210 | 8/2004 |

OTHER PUBLICATIONS

Deering, Request for Comments 1112, Aug. 1989, Internet Engineering Task Force, p. 6.*
Deering, Request for Comments 1112, Aug. 1989, Internet Engineering Task Force, p. 6.*

* cited by examiner

*Primary Examiner*—Daniel J Ryman
*Assistant Examiner*—Christopher Crutchfield
(74) *Attorney, Agent, or Firm*—Oblon, Spivak, McClelland, Maier & Neustadt, L.L.P.

(57) ABSTRACT

A communication device configured to receive a first packet from a first network including a virtual network, and to transmit a second packet to a second network, the communication device including: a receiver section configured to receive the first packet from the first network; a converter section configured to convert a second destination address of the first packet to the first destination address of the second packet using identifying information of the virtual network; a selector configured to select a security parameter based at least in part on the first destination address of the second packet; an encryption section configured to encrypt the second packet based on the security parameter; and a transmitter section configured to multicast the encrypted second packet to the second network.

30 Claims, 10 Drawing Sheets

| MAC Address | Encryption System | Key Information |
|---|---|---|
| 03:00:01:00:00:01 | WEP | Key1 |
| 03:00:02:00:00:01 | WEP | key2 |
| ....... | ....... | ....... |

| MAC Address | VLAN ID | Encryption System | Key Information |
|---|---|---|---|
| 01:00:5e:00:00:01 | 0001 | WEP | Key1 |
| 01:00:5e:00:00:01 | 0002 | WEP | key2 |
| ....... | ....... | ....... | ....... |

COMMUNICATION DEVICE, COMMUNICATION SYSTEM, AND COMMUNICATION METHOD

CROSS REFERENCE TO RELATED APPLICATIONS

This application is based upon and claims the benefit of priority under 35 U.S.C. § 119 from prior Japanese Patent Application P2004-282775 filed on Sep. 28, 2004, the entire contents of which are incorporated by reference herein.

BACKGROUND OF THE INVENTION

1. Field of the Invention

The present invention relates to a radio communication apparatus, a radio communications system, and a radio-communications method based on IEEE 802.11, especially supporting virtual LAN.

2. Description of the Background

IEEE 802.3 is a well known standard for communicating on a wired LAN, and IEEE 802.11 is a well known standard for communicating on wireless LAN. They are established by the IEEE (Institute of Electrical and Electronics Engineers, Inc.).

IEEE 802.3 is a standard generally known as "Ethernet"™. According to this standard, "Ether frame" packets are transferred between wired terminals in 60-1514 bytes per second.

On the other hand, IEEE 802.11, which is a standard for the wireless LAN, has several versions (e.g. IEEE 802.11a, IEEE 802.11b, and IEEE 802.11g). There are differences in communication frequency and transfer rate between them.

IEEE also recommends IEEE 802.1Q relating to a VLAN (Virtual LAN). IEEE 802.1Q can be used together with IEEE 802.3 and IEEE 802.11. A VLAN includes two or more virtual local area networks built in a network.

Moreover, IEEE 802.11i for communication security is also recommended. IEEE 802.1Q defines a security mechanism with encrypting transferred data based on IEEE 802.11.

However, the security mechanism of IEEE 802.11i cannot work in the VLAN of IEEE 802.IQ because security parameters of IEEE 802.11i are selected based on a destination MAC (Media Access Control) address of the Ether frame.

For example, a terminal that can receive a multicasted or broadcasted Ether frame destined for a MAC address of another terminal that belongs to a VLAN may also be able to receive Ether frames destined for other VLANs.

If an encryption key of first a VLAN is different from encryption keys for other VLANs, a terminal that belongs to one of the other VLANs cannot interpret an Ether frame that is destined for the first VLAN. However, that terminal of the other VLAN also cannot recognize Ether frames sent as part of a third party attack or by mistake. Thus, a terminal that supports IEEE 802.11i cannot fulfill the requirements of IEEE 802.1Q VLAN.

As an attempt to solve this problem, JP-A-2004-200812 describes a method to provide new session information on multicast communication to provide security between multicast groups.

SUMMARY OF THE INVENTION

According to an exemplary embodiment, the present invention provides a communication device configured to receive a first packet from a first network including a virtual network, and to transmit a second packet to a second network, the communication device including: a receiver section configured to receive the first packet from the first network; a converter section configured to convert a second destination address of the first packet to the first destination address of the second packet using identifying information of the virtual network; a selector configured to select a security parameter based at least in part on the first destination address of the second packet; an encryption section configured to encrypt the second packet based on the security parameter; and a transmitter section configured to multicast the encrypted second packet to the second network.

Another non-limiting aspect of the present invention provides a communication system, including: a first network configured to support a virtual network; a first communication device configured to transmit a first packet, which includes identifying information of the virtual network, through the first network; a second network configured to transfer a second packet, the second packet being encrypted based on a security parameter selected according to a first destination address of the second packet; a second communication device configured to connect the second network; and a third communication device configured to receive the first packet from the first network, to convert a second destination address of the first packet to the first destination address of the second packet using the identifying information of the virtual network, to encrypt the second packet based on the security parameter selected according to the first destination address of the second packet, and to multicast the encrypted second packet to the second network.

Yet another non-limiting aspect of the present invention includes a communication method for receiving a first packet from a first network including a virtual network, and for transmitting a second packet to a second network, the method including: receiving the first packet from the first network; converting a second destination address of the first packet to a first destination address of the second packet using identifying information of the virtual network; encrypting the second packet based on a security parameter selected according to the second destination address; and multicasting the encrypted second packet to the second network.

Another aspect of the present invention includes a communication device, including: a receiver configured to receive a first packet from a virtual network; a converter configured to convert the first packet to a second packet addressed to a second network; a selector configured to select a security parameter based at least in part on at least one characteristic of the second packet; an encryption device configured to encrypt the second packet based on the security parameter; and a transmitter configured to transmit the encrypted second packet to the second network.

The present invention further provides communication system, including: a virtual network; a first communication device configured to transmit a first packet; and a second communication device configured to receive the first packet from the virtual network and to convert a second destination address of the first packet to a first destination address of a second packet based on identification information of the virtual network.

BRIEF DESCRIPTION OF THE DRAWINGS

The invention is best understood from the following description of the non-limiting embodiments when read in connection with the accompanying drawings, wherein:

FIG. 6 is a diagram illustrating an encryption key table according to a non-limiting aspect of the invention;

FIG. 9 is a diagram illustrating an encryption key table according to a non-limiting aspect of the second modification of the invention.

DETAILED DESCRIPTION OF THE INVENTION

Figure 1:
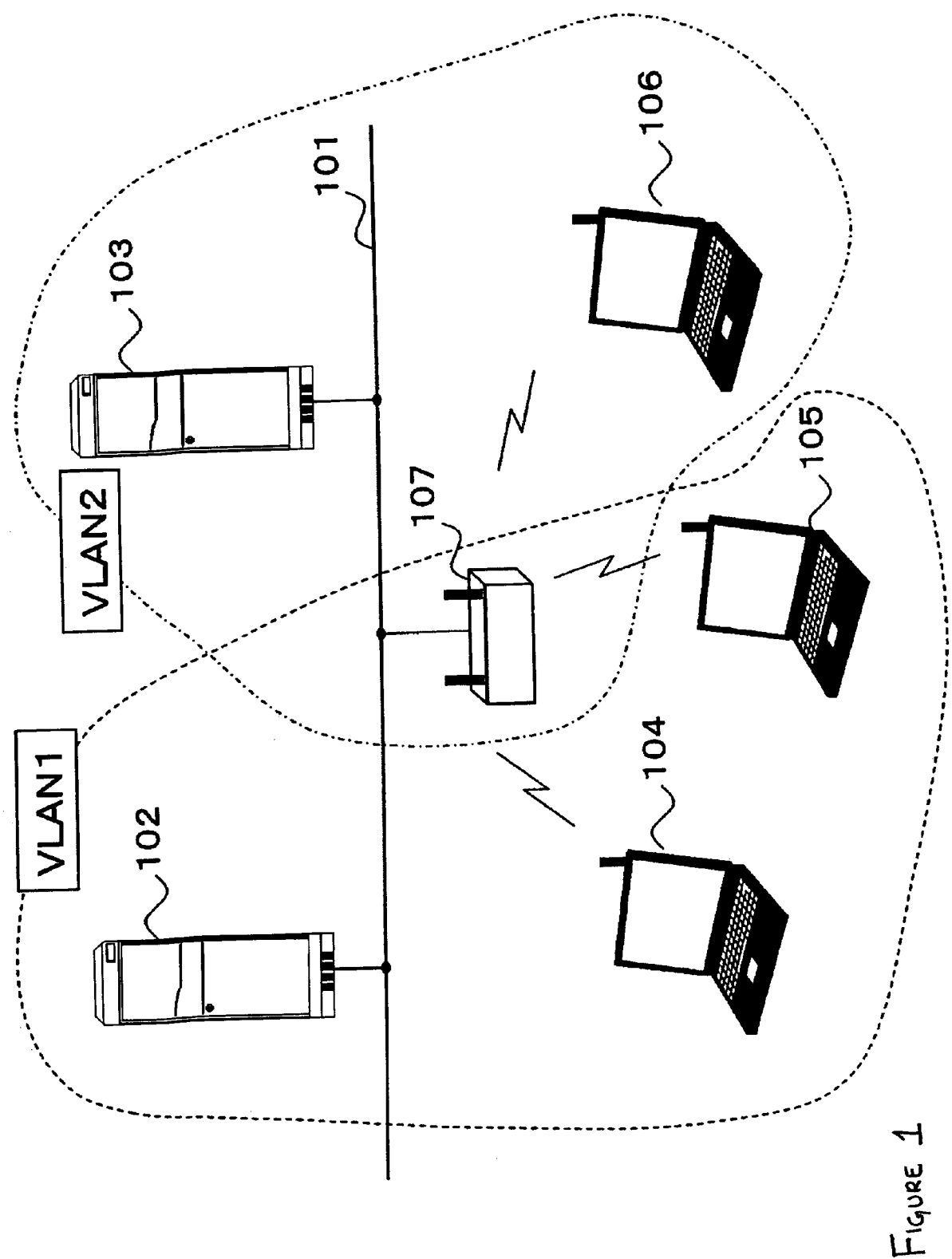
FIG. 1 is a diagram illustrating a virtual LAN communication system according to a non-limiting aspect of the invention.

Referring now to the drawings, in which like reference numerals designate identical or corresponding parts throughout the several views, FIG. 1 illustrates an example of a first non-limiting embodiment of a virtual LAN communication system according to the invention.

The virtual LAN communication system includes a network 101, a host 102, a host 103, a PC 104, a PC 105, a PC 106, and an access point 107. The network 101 is a wired LAN network based on IEEE 802.3.

The host 102 is a server having a network connection interface based on IEEE 802.1Q and IEEE 802.3. The host 102 can communicate with the access point 107, the PC 104, and the PC 105 via the network 101. The host 102 belongs to a virtual LAN (VLAN1) based on IEEE 802.1Q.

The host 103 is a server having a network connection interface based on IEEE 802.1Q and IEEE 802.3. The host 103 can communicate with the access point 107, the PC 104, and the PC 105 via the network 101. The host 103 belongs to another virtual LAN (VLAN2) based on IEEE 802.1Q.

The PC 104 and the PC 105 may be portable type PCs (e.g., laptop computers). The PC 104 and the PC 105, respectively, have a wireless LAN connection interfaces based on IEEE 802.11i. The PC 104 and the PC 105 belong to the VLAN1, and can communicate securely with the host 102 connected to the network 101 through the access point 107.

The PC 106 may be a portable type PC (e.g., a laptop computer). The PC 106 has a wireless LAN connection interface based on IEEE 802.11i. The PC 106 belongs to the VLAN2, and can communicate securely with the host 103 connected to the network 101 through the access point 107.

The access point 107 includes both the wired LAN network connection interface based on IEEE 802.3 and the wireless LAN connection interface based on IEEE 802.11. Terminals that belong to the wireless LAN or connect to the wired LAN network communicate with each other via the access point 107.

The access point 107 provides VLAN1 environment and VLAN2 environment based on IEEE 802.1Q for the wired LAN. The access point 107 can separately treat the communications of VLAN1 and the communications of VLAN2. The access point 107 provides security based on IEEE 802.11i for the wireless LAN.

The access point 107 changes the destination MAC address of a multicasted packet or a broadcasted packet according to the VLAN to which the sender terminal and the destination terminal belong. The access point 107 encrypts the packet according to the encryption parameter for the destination MAC address, and transmits the encrypted packet to the wireless LAN.

A packet multicasted or broadcasted in a VLAN on the wired LAN can reach the same terminal in the VLAN on the wireless LAN because a particular destination MAC address treated in the wired LAN is associated with the particular VLAN on the wireless LAN.

Figure 2:
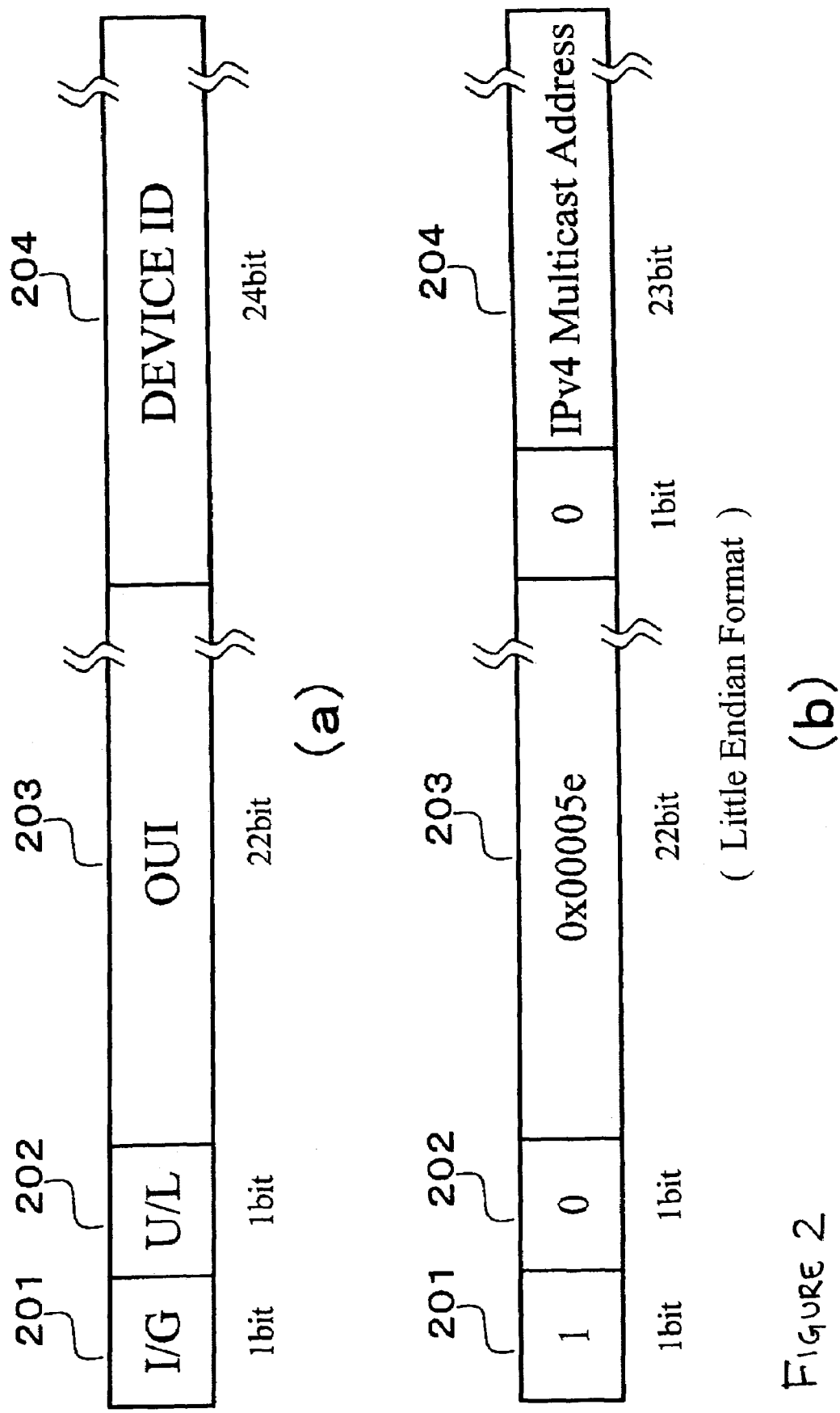
FIG. 2 is a diagram illustrating a structure of a MAC address based on IEEE 802.3 according to a non-limiting aspect of the invention.

FIG. 2 illustrates a structure of a MAC address based on IEEE 802.3. FIG. 2(a) illustrates each field of a 48 bit MAC address. FIG. 2(b) illustrates an example of the 48 bit MAC address of a multicasted packet in little endian format.

An I/G 201 is a bit for identifying that the MAC address is for Individual (unicast) or for Group (multicast). The I/G 201 is set to 0 when the MAC address is for an Individual (individual destination). The I/G 201 is set to 1 when the MAC address is for a Group (multicast for terminals in a particular group).

A U/L 202 is a bit for identifying that the MAC address is for Universal (Global address) use or for Local (Private address) use. The U/L 202 is set to 0 when the MAC address is universally unique. The U/L 202 is set to 1 when the MAC address is only locally available.

An OUI (Organizationally Unique Identifier) 203 is a field that indicates the value managed for every manufacturer. Each manufacturer has unique value of OUI 203 and IEEE distributes the values of OUI 203. The value of OUI 203 prevents the existence of identical MAC addresses because the value of OUI 203 is different for each manufacturer.

A DEVICE ID 204 is a value that is distributed by the manufacturer. The manufacturer distributes different values for the DEVICE ID 204 for each network interface device.

In FIG. 2(b), when the value of the I/G 201 is 1, it represents that the destination MAC address indicates a group for multicasting. When the value of U/L 202 is 0, it represents that the MAC address is unique in the whole world.

According to RFC (Request for Comment) 1112 that specifies a MAC address on multicasting, the value of the OUI 203 should be "0x00005e", irrespective of the manufacturer.

RFC1112 also specifies that the length of the MAC address on multicasting should be 23 bits when using IPv4. So the value of the leftmost bit of the DEVICE ID 204 is given as 0.

A multicast address is stored from the neighbor bit of the leftmost bit of the DEVICE ID 204. The MAC address may be interpreted as a broadcast address if the value of the DEVICE ID 204 is "ff:ff:ff".

As described above, the structure of the MAC address in the case of multicasting is specified. Communication devices can interpret what kind of MAC address it is by reading each field of the MAC address.

The example of FIG. 2(b) is in little endian format. Other configurations than described above may be employed if a format other than little endian is employed for the MAC address.

Figure 3:
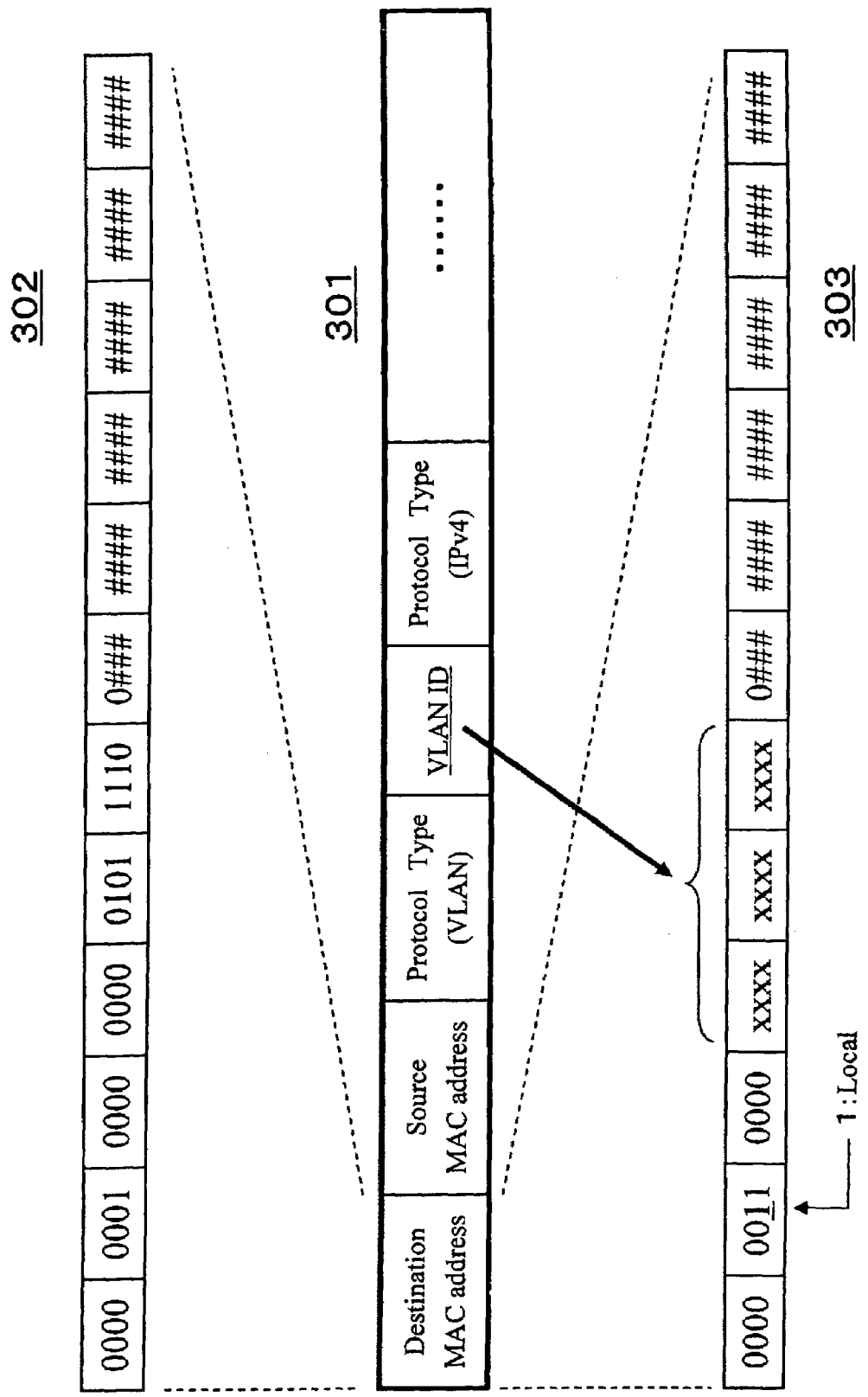
FIG. 3 is a diagram illustrating a destination MAC address of multicasted Ether frame according to a non-limiting aspect of the invention.

FIG. 3 illustrates an example of conversion of a destination MAC address of multicasted Ether frame stipulated in IEEE 802.3. Ether frame 301 pursuant to IEEE 802.3, a field of the destination MAC address in wired LAN 302, and a field of the destination MAC address in wireless LAN 303 are illustrated in FIG. 3. The MAC address in FIG. 3 is in big endian format, so each bit position is different from the MAC address in FIG. 2 in little endian format.

The Ether frame 301 includes information such as a destination MAC address, a source MAC address, a first protocol type (it is "VLAN" in this example), a VLAN ID, and a second protocol type (it is "IPv4" in this example). The destination MAC address indicates the destination of the Ether frame 301. The source MAC address indicates a MAC address of the communication device that transmits the Ether frame. The first protocol type indicates that a communication device belonging to a VLAN multicasts the Ether frame. The VLAN ID indicates the VLAN to which the communication device that multicasts the Ether frame belongs.

In the field of the destination MAC address in wired LAN 302, as same as in FIG. 2(b), if the value of the I/G is 1, it represents that the MAC address indicates a group for multicasting. When the value of U/L is 0, it represents that the MAC address is unique in the whole world. When the value of OUI is "0x00005e", it indicates that the Ether frame is multicasted. The value of the leftmost bit of the DEVICE ID 204 is given as 0, and other bits of the DEVICE ID 204 may be arbitrary values.

In the field of the destination MAC address in wireless LAN 303, the value of the bit of the U/L 202 is 1 that indicates the MAC address is Local. As a result, the field of OUI 203 can be used to contain the VLAN ID.

As described above, the destination MAC address in wired LAN indicates the destination VLAN to be multicasted. Different security parameters can be set for each VLAN if IEEE 802.11i is employed, since IEEE 802.11i enables different security parameters for each destination MAC address.

Figure 4:
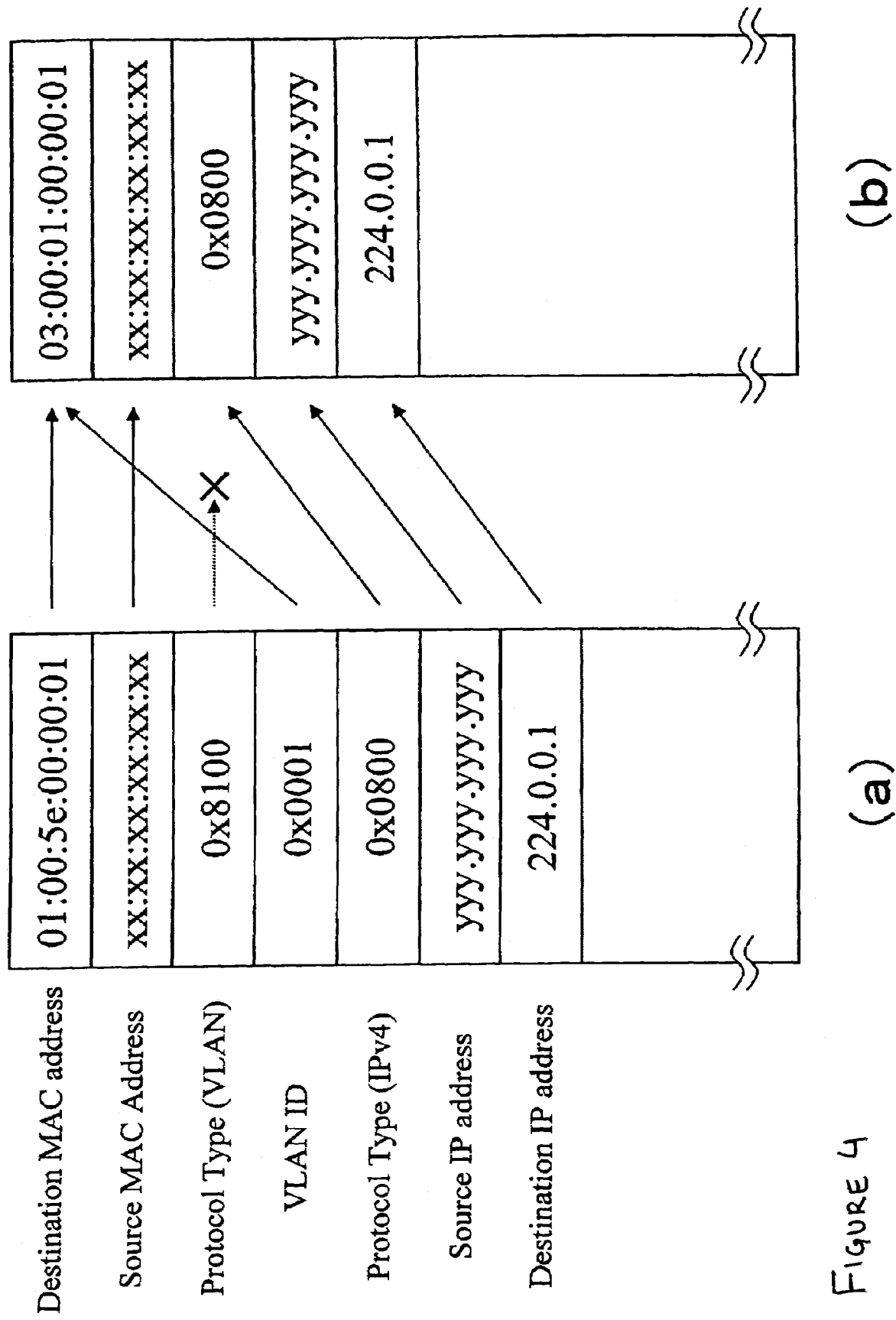
FIG. 4 is a diagram illustrating an Ether frame according to a non-limiting aspect of the invention.

FIG. 4 illustrates an example of conversion of a multicasted Ether frame stipulated in IEEE 802.3. FIG. 4(a) illustrates an Ether frame in wired LAN (Ether frame (a)). FIG. 4(b) illustrates an Ether frame in wireless LAN converted from the Ether frame (a) by the access point 107 (Ether frame (b)).

The Ether frame (a) has the same structure as the Ether frame 301 shown in FIG. 3. That is, the Ether frame (a) includes information such as a destination MAC address, a source MAC address, a first protocol type (it is "0x8100" in this example), and a VLAN (it is "0x0001" in this example).

When the Ether frame (a) is transmitted to the wireless LAN, the access point 107 converts the Ether frame (a). The Ether frame (b) has information of a new destination MAC address. The new destination MAC address is found by using the VLAN ID quoted from the Ether frame (a). The Ether frame (b) also has information of the MAC address "03:00:01:00:00:01" as the destination MAC address.

The Ether frame (b) may not have fields of the first protocol type and the VLAN ID. The Ether frame (b) may be shorter than the Ether frame (a) as long as fields of the first protocol type and the VLAN ID are included in the Ether frame (b).

The access point 107 transmits the Ether frame (b), instead of the Ether frame (a) to the communication device that connects to the wireless LAN.

Figure 5:
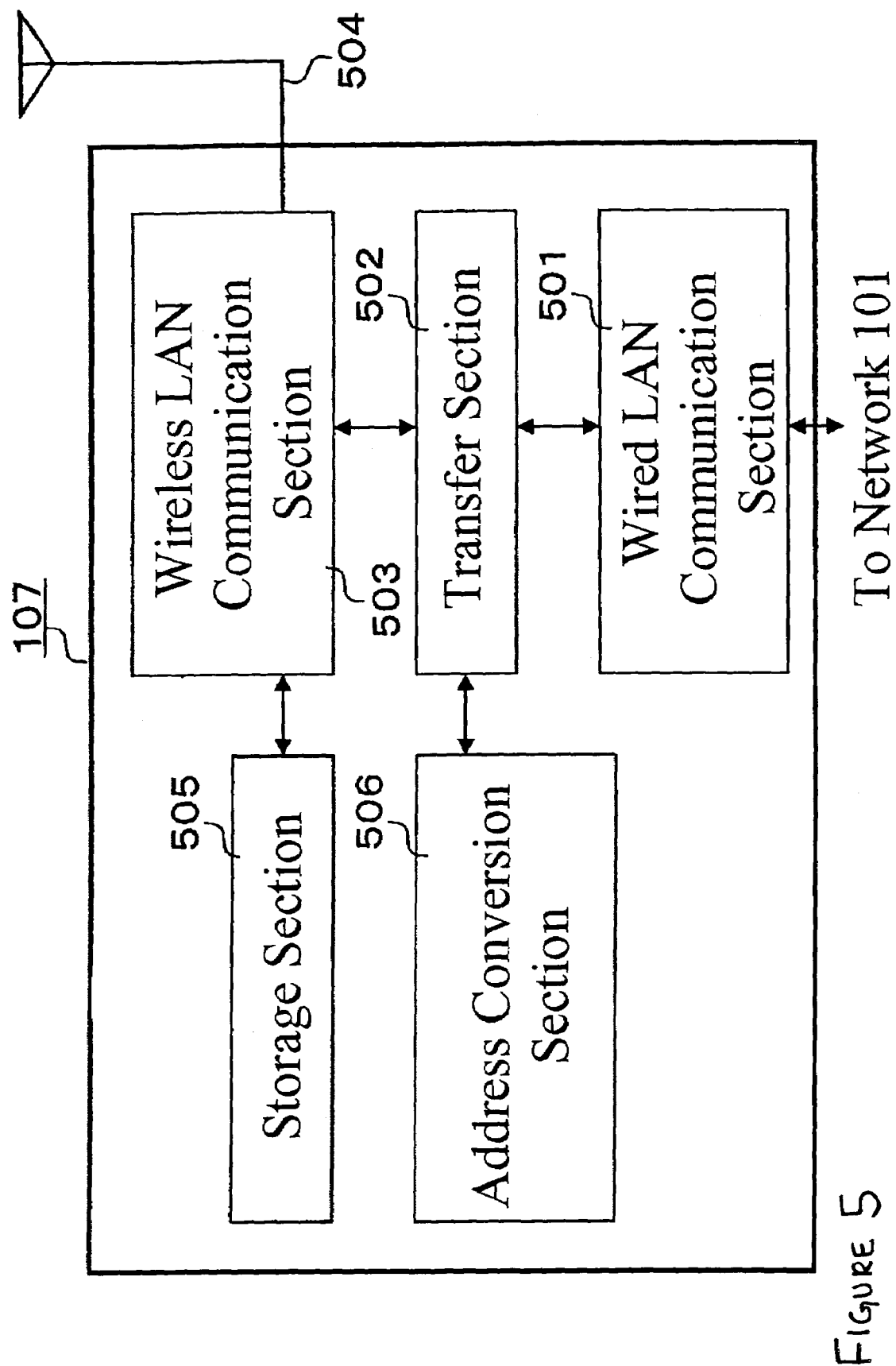
FIG. 5 is a diagram illustrating an access point according to a non-limiting aspect of the invention.

FIG. 5 illustrates an example of the block diagram of the access point 107. The access point 107 comprises a wired LAN communication section 501, a transfer section 502, a wireless LAN communication section 503, an antenna 504, a storage section 505, and an address conversion section 506.

The wired LAN communication section 501 communicates with the host 102 and the host 103 through the network 101 based on IEEE 802.3. The wired LAN communication section 501 has a VLAN function specified in IEEE 802.1Q.

The transfer section 502 transfers a converted multicasted/broadcasted Ether frame, which has converted destination MAC address, between the wired LAN and the wireless LAN with a support of the address conversion section 506. The transfer section 502 may converts the structure of the Ether frame as shown in FIG. 4.

The wireless LAN communication section 503 communicates with the communication devices through the wireless LAN based on IEEE 802.11 according to transfer directions from the transfer section 502. The storage section 505 stores an encryption key table for encrypting the Ether frame based on IEEE 802.11i. The encryption key table has information of a relationship between an encryption system and an encryption key. The encryption key table is inputted in advance of the communication.

The antenna 504 transmits and receives radio waves used for communication in the wireless LAN.

The address conversion section 506 converts the destination MAC address of the Ether frame transferred transfer section 502. The address conversion section 506 converts the destination MAC address of the Ether frame muticasted/Broadcasted on the network 101 from a terminal that belongs to some VLAN.

FIG. 6 illustrates an example of the encryption key table 601 stored in the storage section 505. The encryption key table 601 has information related to a MAC address, an encryption system, and an encryption key associated with each other. The MAC address is associated with a VLAN on the wireless LAN, rather than with a particular device.

In other words, when the transfer section 502 transfers an Ether frame to the MAC address associated with a VLAN on the wireless LAN, the wireless LAN communication section 503 finds the MAC address written in the Ether frame as destination MAC address from the encryption key table 601, and encrypts the Ether frame according to the encryption system and the encryption key associated with the MAC address on the encryption key table 601.

The MAC address written on the encryption key table 601 represents the new MAC address found by using the VLAN ID. Thus, different MAC addresses for multicasting/broadcasting in the wireless LAN are associated with each VLAN. It enables the multicasting/broadcasting in a VLAN from the wired LAN side to the wireless LAN side. This invention also enables different wireless LAN security parameters to be established for each VLAN.

Therefore, multicasting/broadcasting communication for every VLAN based on IEEE 802.1Q can be done seamlessly between the wired LAN based on IEEE 802.3 and the wireless LAN based on IEEE 802.11i.

First Non-Limiting Modification:

In this modification, the encryption key on the encryption key table 601 is provided by a key exchange protocol. IEEE 802.1x, IEEE 802.11i, and WPA (Wi-Fi Protected Access) are known key exchange protocols.

Figure 7:
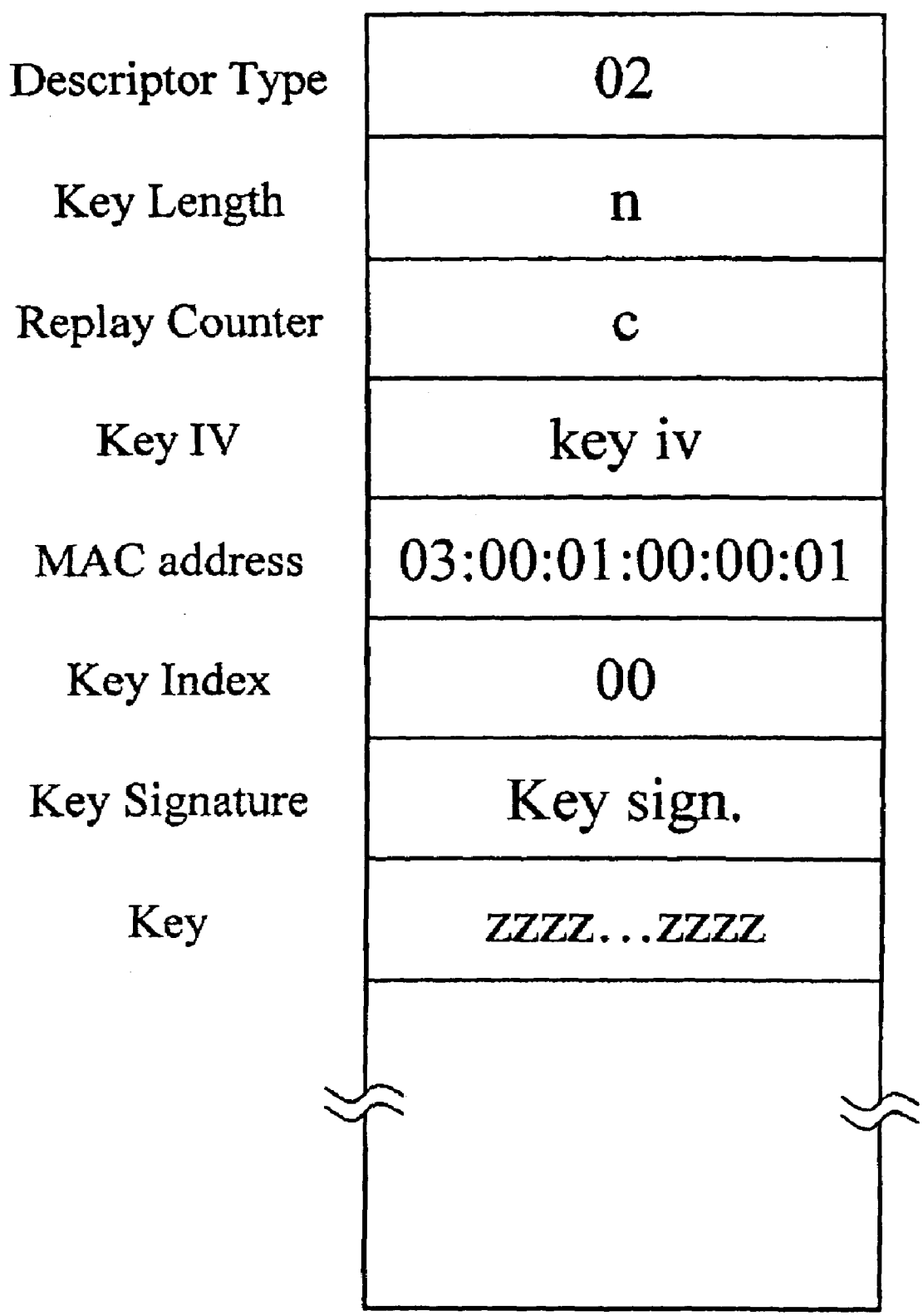
FIG. 7 is a diagram illustrating a modified Key Descriptor message according to a non-limiting aspect of the invention.

FIG. 7 illustrates an example of a modified Key Descriptor message. The modified Key Descriptor message has not only information stipulated in IEEE 802.1x, but also key exchange information.

In this example, a field of a MAC address for multicasting and a field of key information are added to the Key Descriptor message stipulated in IEEE 802.1x. In other key exchange protocols, these fields can be added similarly.

The exchange of the encryption key for multicasting may be, for example, (1) a part of a key exchanging procedure of a general authentication procedure when receiving a connection request from other communication device, or (2) a part of an IGMP (Internet Group Management Protocol) procedure when a communication device wants to receive a multicasted Ether frame. In the case of (1), the key information for multicasting may be exchanged in authentication and key exchange procedure. In the case of (2), the key information for multicasting may be exchanged in authentication procedure on higher protocol.

By this modification, multicasting/broadcasting communication for every VLAN based on IEEE 802.1Q with the security system based on IEEE 802.11i can be done seamlessly between the wired LAN based on IEEE 802.3 and the wireless LAN based on IEEE 802.11i.

Second Non-Limiting Modification:

In this modification, a first encryption key is associated with a MAC address, and a second encryption key is associated with a VLAN ID on the encryption key table 601.

Figure 8:
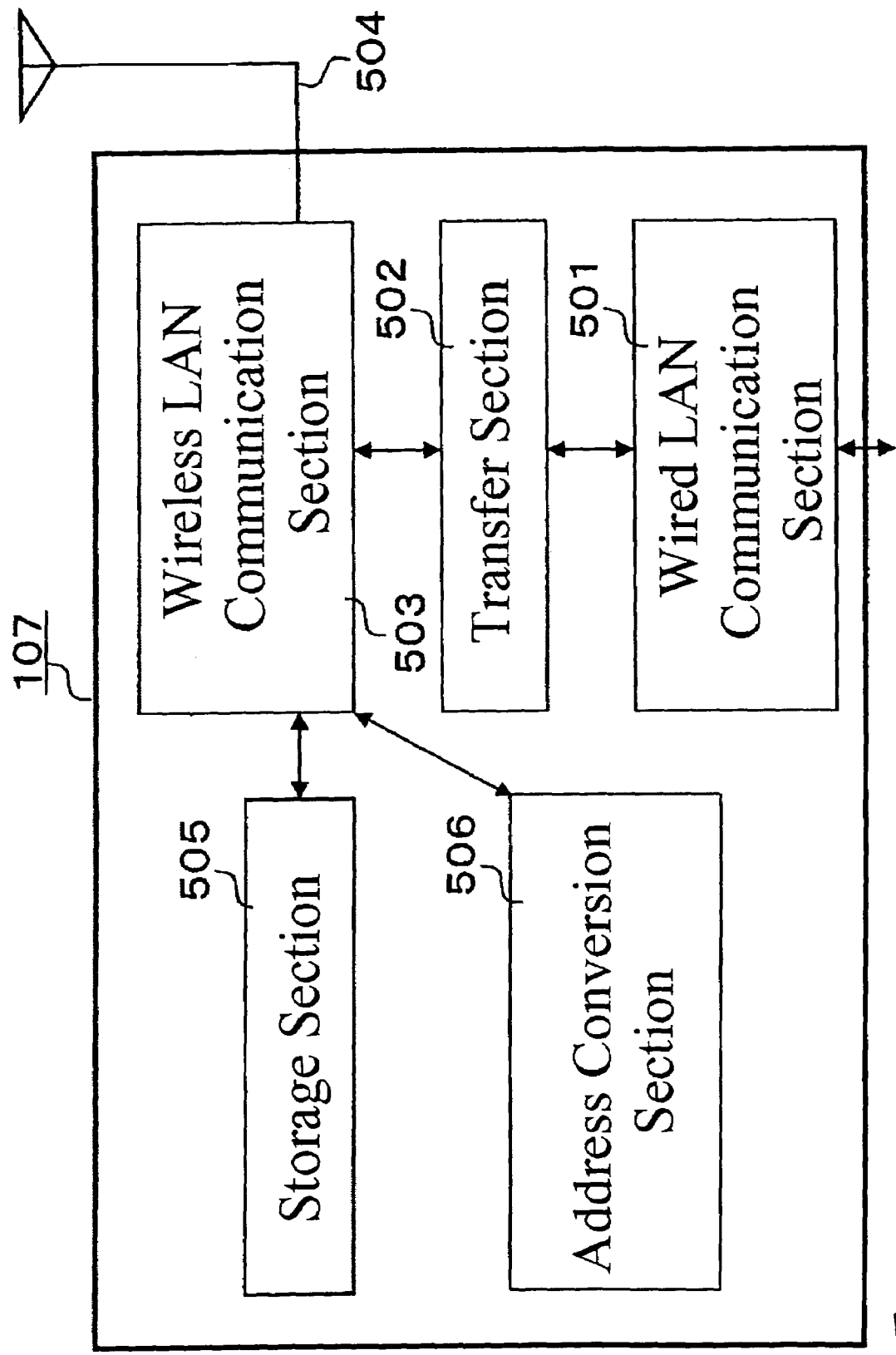
FIG. 8 is a diagram illustrating an access point according to a non-limiting aspect of the second modification of the invention.

FIG. 8 illustrates a diagram of an example of the access point 107 in this modification. The difference from FIG. 5 is the line connecting the address conversion section 506 and the wireless LAN communication section 503.

FIG. 9 illustrates an example of the encryption key table 901 in this modification. The encryption key table 901 contains the MAC address before the conversion and VLAN ID are associated with each other.

In this case, the transfer section 502 directs the combination of the destination MAC address and the VLAN ID, and the wireless LAN communication section 503 finds out the combination from the encryption key table 901.

The address conversion section 506 provides the new destination MAC address converted from the found MAC address and the found VLAN. The wireless LAN communication section 503 encrypts the Ether frame, and transmits it to the new destination MAC address.

Figure 10:
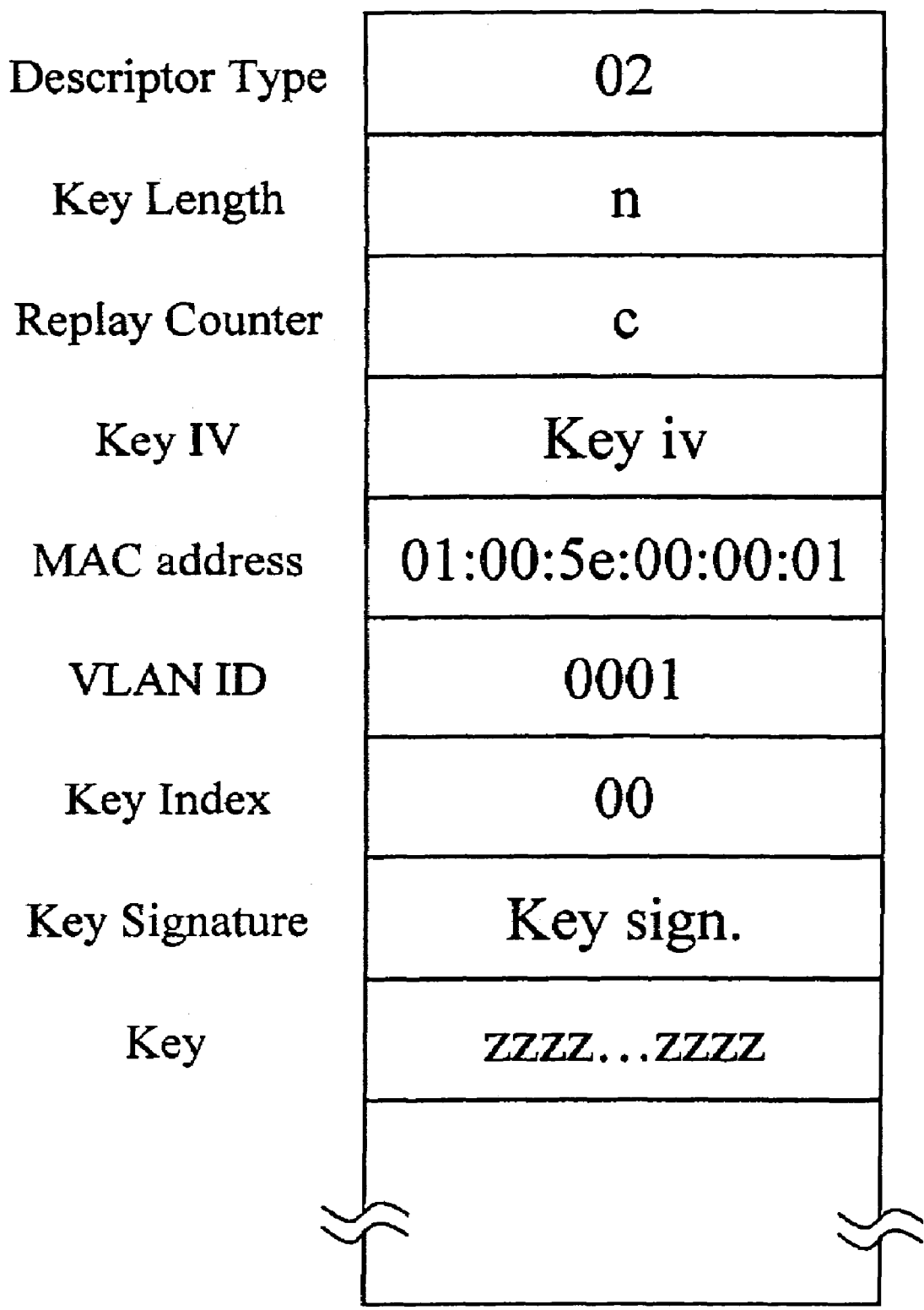
FIG. 10 is a diagram illustrating a modified Key Descriptor message according to a non-limiting aspect of the second modification of the invention.

As in FIG. 7, FIG. 10 illustrates an example of a modified Key Descriptor message. Information of the VLAN ID is added to the modified Key Descriptor message shown in FIG. 7. The timing and the procedure of key exchange are same as in the first modification. Thus, multicasting/broadcasting communication for every VLAN based on IEEE 802.1Q can be done seamlessly and automatically between the wired LAN based on IEEE 802.3 and the wireless LAN based on IEEE 802.11i.

While the invention has been described in detail and with reference to specific embodiments thereof, it will be apparent to one skilled in the art that various changes and modifications can be made therein without departing from the spirit and scope thereof.

What is claimed is:

1. A communication device configured to receive a first packet from a first network including a virtual network, and to transmit a second packet to a second network, the communication device comprising:
   a receiver section configured to receive the first packet from the first network;
   a converter section configured to convert a destination MAC address of the first packet to a destination MAC address of the second packet using virtual network identifying information of the first packet;
   a selector configured to select a security parameter based at least in part on the destination MAC address of the second packet;
   an encryption section configured to encrypt the second packet based on the security parameter; and
   a transmitter section configured to multicast the encrypted second packet to the second network, wherein the first network is based on IEEE 802.3-2002, the virtual network is a VLAN based on IEEE 802.1Q-2003, the second network is based on IEEE 802.11-1999, the encryption is based on IEEE 802.11i-2004, and the destination MAC address of the second packet is comprised of at least a portion of the destination MAC address of the first packet and a portion of the virtual network identifying information of the first packet.

2. The communication device of claim 1, further comprising: a memory section configured to store an encryption key table including information of the destination MAC address of the second packet, an encryption system, and an encryption key associated with the destination MAC address of the second packet and the encryption system, wherein the encryption section is configured to encrypt the second packet based on the encryption system and the encryption key.

3. The communication device of claim 1, further comprising: a memory section configured to store an encryption key table which includes information of the destination MAC address of the first packet, the identifying information of the virtual network, an encryption system, and an encryption key associated with the destination MAC address of the first packet and the encryption system, wherein the encryption section is configured to encrypt the second packet based at least in part on the encryption system, the encryption key, and the identifying information of the virtual network in the encryption key table.

4. A communication system, comprising:
   a first network configured to support a virtual network;
   a first communication device configured to transmit a first packet, which includes virtual network identifying information, through the first network;
   a second network configured to transfer a second packet, the second packet being encrypted based on a security parameter selected according to a destination MAC address of the second packet;
   a second communication device configured to connect the second network; and
   a third communication device configured to receive the first packet from the first network, to convert a destination MAC address of the first packet to the destination MAC address of the second packet using the identifying information of the virtual network, to encrypt the second packet based on the security parameter selected according to the destination MAC address of the second packet, and to multicast the encrypted second packet to the second network,
   wherein the first network is based on IEEE 802.3-2002, the virtual network is a VLAN based on IEEE 802.1Q-2003, the second network is based on IEEE 802.11-1999, the encryption is based on IEEE 802.11i-2004, and the destination MAC address of the second packet is comprised of at least a portion of the destination MAC address of the first packet and a portion of the virtual network identifying information of the first packet.

5. A communication method for receiving a first packet from a first network including a virtual network, and for transmitting a second packet to a second network, the method comprising:
   receiving the first packet from the first network;
   converting a destination MAC address of the first packet to a destination MAC address of the second packet using virtual network identifying information of the first packet;
   encrypting the second packet based on a security parameter selected according to the destination MAC address of the first packet; and multicasting the encrypted second packet to the second network, wherein the first network is based on IEEE 802.3-2002, the virtual network is a VLAN based on IEEE 802.1Q-2003, the second network is based on IEEE 802.11-1999, the encrypting is based on IEEE 802.11i-2004, and the destination MAC address of the second packet is comprised of at least a portion of the destination MAC address of the first packet and a portion of the virtual network identifying information of the first packet.

6. A communication device, comprising:
a receiver configured to receive a first packet from a virtual network;
a converter configured to convert the first packet having destination MAC address and virtual network identifying information to a second packet having a destination MAC address addressed to a second network;
a selector configured to select a security parameter based at least in part on at least one characteristic of the second packet;
an encryption device configured to encrypt the second packet based on the security parameter; and
a transmitter configured to transmit the encrypted second packet to the second network,
wherein the first network is based on IEEE 802.3-2002, the virtual network is a VLAN based on IEEE 802.1Q-2003, the second network is based on IEEE 802.11-1999, the encryption is based on IEEE 802.11i-2004, and the destination MAC address of the second packet is comprised of at least a portion of the destination MAC address of the first packet and a portion of the virtual network identifying information of the first packet.

7. The communication device according to claim 6, wherein the at least one characteristic includes the destination MAC address of the first packet.

8. The communication device according to claim 6, wherein the destination MAC address of the second packet is determined based at least in part on the virtual network identifying information of the first packet.

9. The communication device according to claim 6, further comprising: a memory configured to store an encryption key table including at least one of the destination MAC address of the second packet, an encryption system, and an encryption key.

10. The communication device according to claim 9, wherein the encryption key is associated with at least one of the destination MAC address of the second packet and the encryption system.

11. The communication device of claim 10, wherein the encryption device is configured to encrypt the second packet based at least in part on the encryption system and the encryption key associated with the destination MAC address of the second packet.

12. The communication device of claim 9, wherein the encryption device is configured to encrypt the second packet based at least in part on the encryption system and the encryption key.

13. The communication device of claim 6, further comprising a memory configured to store an encryption key table including at least one of the destination MAC address of the first packet, the virtual network identifying information of the first packet, an encryption system, and an encryption key.

14. The communication device of claim 13, wherein the encryption key is associated with at least one of the destination MAC address of the first packet and the encryption system.

15. The communication device of claim 14, wherein the encryption device is configured to encrypt the second packet based at least in part on the encryption system and the encryption key associated with the destination MAC address of the first packet.

16. The communication device of claim 15, wherein the encryption device is configured to encrypt the second packet based at least in part on the virtual network identifying information of the first packet.

17. The communication device according to claim 6, wherein the security parameter is also selected based at least in part on the virtual network identifying information of the first packet.

18. A communication system, comprising:
a first network having a virtual network;
a first communication device configured to transmit a first packet having virtual network identifying information of the virtual network on the first network; and
a second communication device configured to receive the first packet from the first communication device via the first network, to convert a destination MAC address of the first packet to a destination MAC address of a second packet for transmission to a second network based on the virtual network identifying information of the first packet, and to encrypt the second packet, wherein the first network is based on IEEE 802.3-2002, the virtual network is a VLAN based on IEEE 802.1Q-2003, the second network is based on IEEE 802.11-1999, the encryption is based on IEEE 802.11i-2004, and the destination MAC address of the second packet is comprised of at least a portion of the destination MAC address of the first packet and a portion of the virtual network identifying information of the first packet.

19. The communication system of claim 18, wherein a security parameter for encrypting the second packet is selected based at least in part on the destination MAC address of the first packet.

20. The communication system of claim 18, wherein the second communication device is configured to multicast the second packet to the second network.

21. The communication system of claim 18, further comprising: a memory configured to store an encryption key table including at least one of the destination MAC address of the second packet, an encryption system, and an encryption key.

22. The communication system of claim 21, wherein the encryption key is associated with at least one of the destination MAC address of the second packet and the encryption system.

23. The communication system of claim 22, wherein the second communication device is configured to encrypt the second packet based at least in part on the encryption system and the encryption key associated with the destination MAC address of the second packet.

24. The communication system of claim 21, wherein the second communication device is configured to encrypt the second packet based at least in part on the encryption system and the encryption key.

25. The communication system of claim 18, further comprising: a memory configured to store an encryption key table including at least one of the destination MAC address of the first packet, the virtual network identifying information of the first packet, an encryption system, and an encryption key.

26. The communication system of claim 25, wherein the encryption key is associated with at least one of the destination MAC address of the first packet and the encryption system.

27. The communication system of claim 26, wherein the second communication device is configured to encrypt the second packet based at least in part on the encryption system and the encryption key associated with the destination MAC address of the first packet.

28. The communication system of claim 27, wherein the second communication device is configured to encrypt the second packet based at least in part on the virtual network identifying information.

29. The communication system of claim 25, wherein the second communication device is configured to encrypt the second packet based at least in part on the encryption system and the encryption key.

30. The communication system of claim 25, wherein the second communication device is configured to encrypt the second packet based at least in part on the virtual network identifying information.

* * * * *